(12) United States Patent
Krappe

(10) Patent No.: US 10,067,928 B1
(45) Date of Patent: Sep. 4, 2018

(54) CREATING A SPREADSHEET TEMPLATE FOR GENERATING AN END USER SPREADSHEET WITH DYNAMIC CELL DIMENSIONS RETRIEVED FROM A REMOTE APPLICATION

(71) Applicant: Apttus Inc, San Mateo, CA (US)

(72) Inventor: Kirk Krappe, Portola Valley, CA (US)

(73) Assignee: APTTEX CORPORATION., San Mateo, CA (US)

( * ) Notice: Subject to any disclaimer, the term of this patent is extended or adjusted under 35 U.S.C. 154(b) by 617 days.

(21) Appl. No.: 14/073,326

(22) Filed: Nov. 6, 2013

(51) Int. Cl.
*G06F 17/24* (2006.01)

(52) U.S. Cl.
CPC .................... *G06F 17/246* (2013.01)

(58) Field of Classification Search
CPC .................................................... G06F 17/246
USPC .......................................................... 715/220
See application file for complete search history.

(56) References Cited

U.S. PATENT DOCUMENTS

| | | | |
|---|---|---|---|
| 7,415,664 B2 * | 8/2008 | Aureglia | G06F 17/246 715/212 |
| 2004/0088650 A1 * | 5/2004 | Killen | G06F 17/246 715/213 |
| 2004/0205524 A1 * | 10/2004 | Richter | G06F 17/246 715/213 |
| 2006/0095833 A1 * | 5/2006 | Orchard | G06F 17/246 715/209 |
| 2006/0112329 A1 * | 5/2006 | Collie | G06F 17/2229 715/209 |
| 2006/0167911 A1 * | 7/2006 | Le Cam | G06F 17/246 |
| 2007/0016849 A1 * | 1/2007 | Aureglia | G06F 17/246 715/220 |
| 2007/0136352 A1 * | 6/2007 | Chape | G06Q 10/10 |
| 2007/0185935 A1 * | 8/2007 | Olivieri | G06F 17/246 |
| 2007/0219956 A1 * | 9/2007 | Milton | G06F 17/246 |
| 2008/0306981 A1 * | 12/2008 | Jiang | G06F 17/248 |
| 2009/0044095 A1 * | 2/2009 | Berger | G06F 17/30569 715/226 |
| 2009/0234818 A1 * | 9/2009 | Lobo | G06F 17/30719 |
| 2009/0327321 A1 * | 12/2009 | McCormack | G06F 17/30569 |
| 2010/0169758 A1 * | 7/2010 | Thomsen | G06F 17/246 715/212 |
| 2011/0173529 A1 * | 7/2011 | Wagner | G06Q 10/06 715/235 |
| 2012/0016899 A1 * | 1/2012 | Kumar | G06F 17/30566 707/769 |

(Continued)

OTHER PUBLICATIONS

Abraham, Robin, and Martin Erwig. "Inferring templates from spreadsheets." In Proceedings of the 28th international conference on Software engineering, pp. 182-191. ACM, 2006.*

(Continued)

*Primary Examiner* — Frank D Mills
(74) *Attorney, Agent, or Firm* — HM Law Group LLP; Vani Moodley, Esq.

(57) ABSTRACT

A method for creating a spreadsheet template to facilitate creation of a spreadsheet is disclosed. The method comprises determining at least one dimension for the spreadsheet; creating logic to dynamically determine a dimension range for each dimension when the spreadsheet template is run, and saving said logic in a memory device; and creating logic to map each cell within each dimension range to a remote application object.

15 Claims, 13 Drawing Sheets

(56) References Cited

U.S. PATENT DOCUMENTS

| | | | | |
|---|---|---|---|---|
| 2012/0201457 | A1* | 8/2012 | Bart | G06K 9/00442 |
| | | | | 382/176 |
| 2013/0124960 | A1* | 5/2013 | Velingkar | G06F 17/30286 |
| | | | | 715/220 |
| 2013/0218913 | A1* | 8/2013 | Bart | G06F 17/30339 |
| | | | | 707/755 |
| 2014/0074878 | A1* | 3/2014 | Bornea | G06F 17/2745 |
| | | | | 707/769 |
| 2014/0244416 | A1* | 8/2014 | Venkat | G06Q 30/0603 |
| | | | | 705/26.1 |
| 2015/0095312 | A1* | 4/2015 | Gulwani | G06F 17/246 |
| | | | | 707/722 |
| 2015/0286552 | A1* | 10/2015 | Michelsen | G06F 11/3684 |
| | | | | 714/38.1 |

OTHER PUBLICATIONS

Abraham, Robin, Martin Erwig, Steve Kollmansberger, and Ethan Seifert. "Visual specifications of correct spreadsheets." In Visual Languages and Human-Centric Computing, 2005 IEEE Symposium on, pp. 1-8. IEEE, 2005.*

* cited by examiner

ACTIONS BY SPREADSHEET TEMPLATE

FISCAL PERIODS TABLE 500

| Fiscal Year | Fiscal Period | Fiscal Period Description |
|---|---|---|
| FY13 | FY1301 | FY 13 Jan |
| FY13 | FY1302 | FY 13 Feb |
| ... | | |

*FIG. 5*

BUDGET MASTER TABLE — 600

| Fiscal Year | Active |
|---|---|
| FY13 | Yes |
| FY12 | No |

*FIG. 6*

ORGANIZATION UNIT TABLE

| Org Id | Org Description | Org Parent |
|---|---|---|
| 1 | All Functions | NA |
| 2 | Marketing | All Functions |
| 3 | Sales | All Functions |
| 4 | Global | NA |
| 5 | Europe | Global |
| 6 | UK | Europe |

GENERAL LEDGER ACCOUNTS TABLE

— 800

| Account | Natural Description | Org Unit | Acct Description |
|---|---|---|---|
| 5000 | Expenses | All Functions | Expenses |
| 5100-02-06 | Entertainment | Marketing/UK | Entertainment – Marketing - UK |
| 5101-02-06 | Campaigns | Marketing/UK | Campaigns – Marketing - UK |
| 5102-02-06 | Events | Marketing/UK | Events – Marketing - UK |
| 5110-02-06 | Salaries | Marketing/UK | Salaries – Marketing – UK |
| 5111-02-06 | Advertising | Marketing/UK | Advertising – Marketing – UK |
| 5100-03-06 | Sales/UK | Sales/UK | Entertainment – Sales – UK |
| 5101-03-06 | Sales/UK | Sales/UK | Campaigns – Sales – UK |

*FIG. 8*

| 1 | A | B | C | D | E | F | G |
|---|---|---|---|---|---|---|---|
| 1 | | Fiscal Periods | FY13 Jan | FY13 Feb | FY13 Mar | FY13 Apr | FY13 May |
| 2 | Account | | | | | | |
| 3 | Entertainment | | | | | | |
| 4 | Campaigns | | | | | | |
| 5 | Events | | | | | | |
| 6 | Salaries | | | | | | |
| 7 | Advertisiing | | | | | | |
| 8 | Total | | | | | | |

Table Specifying Dimension Range Behavior 1000

| Data Area | Filter By | Start of Dimension Range | Repeat | Based on Table | Display | Order By |
|---|---|---|---|---|---|---|
| Account | Org Unit | B6 | Down | GL Accounts | Natural Description | Account |
| Fiscal Periods | Fiscal year | C4 | Right | Fiscal Periods | Fiscal Period Description | Fiscal Period |

CREATING A SPREADSHEET TEMPLATE FOR GENERATING AN END USER SPREADSHEET WITH DYNAMIC CELL DIMENSIONS RETRIEVED FROM A REMOTE APPLICATION

FIELD

Embodiments of the present invention relate to spreadsheets. In particular, embodiments of the present invention relate to templates for spreadsheets.

BACKGROUND

Spreadsheets may be used for organization and analysis of data in tabular form. Within a spreadsheet, data is represented as cells of an array, organized in rows and columns. For example in the case of a budget, each column may be used to represent a fiscal period, whereas each row may be used to represent an account.

Within an organization/enterprise spreadsheet templates, e.g. with predefined cell ranges and formulas, may be used to save time.

SUMMARY

A method for creating a spreadsheet template to facilitate creation of an end user spreadsheet is disclosed. The method comprises determining at least one dimension for the spreadsheet; creating logic to dynamically determine a dimension range for each dimension when the spreadsheet template is run, and saving said logic in a memory device; and creating logic to map each cell within each dimension range to a remote application object.

Other aspects of the invention will be apparent from the detailed description below.

BRIEF DESCRIPTION OF THE FIGURES

FIGS. 5-8 show tables provisioned in an enterprise budgeting application, in accordance with one embodiment of the invention.

FIG. 10 shows a table specifying dimension range behavior, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
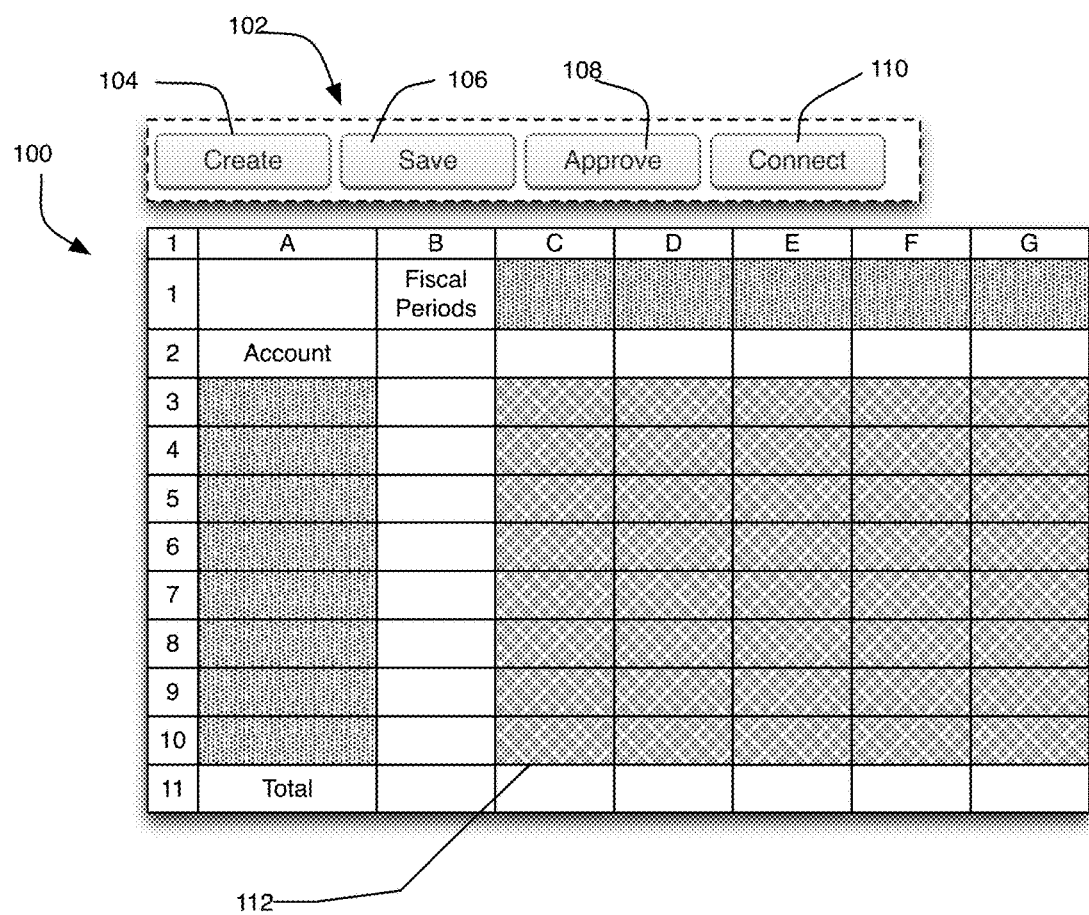
FIG. 1 spreadsheet generated by a spreadsheet template, in accordance with one embodiment of the invention.

Methods and systems for generating a spreadsheet template are disclosed. In one embodiment, the spreadsheet template is to generate a spreadsheet 100 as shown in FIG. 1. The spreadsheet 100 is designed to facilitate the capture of budget data for an enterprise, and includes columns labeled A-G and rows labeled 1-12. It is to be noted that the spreadsheet 100 in not limited to facilitate capturing budget data and may be used to capture data for other purposes. Moreover, it is to be noted that the particular number of rows and columns in the template were selected for illustrative purposes only and may change depending on the application.

In the case of the spreadsheet 100, the columns represent Fiscal Periods for a budget, whereas the rows represent Accounts for the budget. Header information pertaining to the rows and columns of the spreadsheet application (here budgeting) are referred to herein as dimensions. Advantageously, said dimensions are generated dynamically through a connection with a remote application, as will be explained.

The spreadsheet 100 includes a menu area 102. In one embodiment, in addition to the standard spreadsheet buttons found in spreadsheets (e.g. buttons for opening a file, creating a file, saving a file etc.) with, the menu area 102 includes a "create" button 104, a "save" button 106, an "approve" button 108, and a "connect" button 110. The operation of these additional buttons will be explained in greater detail below. The template 100 also includes a grid area 112 to capture input budget data.

Figure 2:
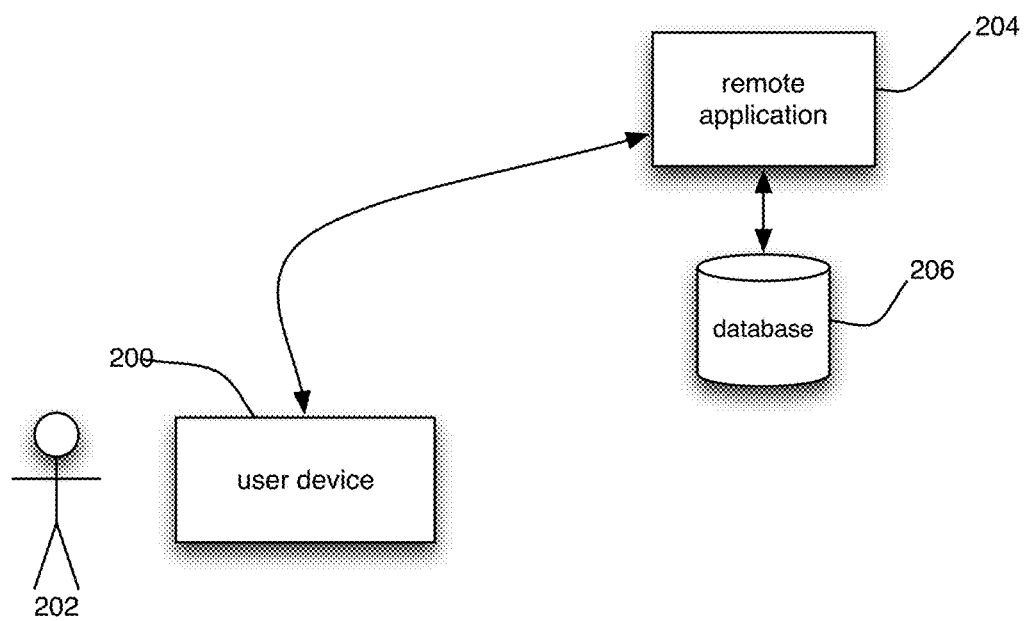
FIG. 2 shows user device running the spreadsheet template of FIG. 1 and connecting to a remote application, in accordance with one embodiment of the invention.

In use, the spreadsheet 100 is opened in a spreadsheet program running on a user device 200 shown in FIG. 2. The user device 200 may include any computing device capable of running a spreadsheet program e.g. Microsoft Excel. For example, the user device may be a desktop/notebook computer, smartphone, or tablet. The user device is under control of a user 202.

Figure 3:
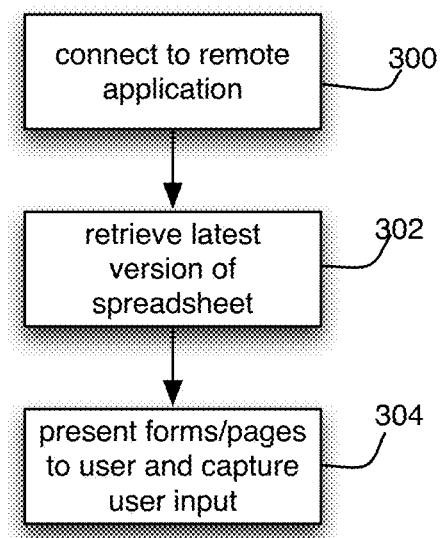
FIGS. 3-4 show flowcharts of actions by the spreadsheet template, in accordance with one embodiment of the invention.

In one embodiment, under control of the user 202 the spreadsheet 100 may be used to perform the actions shown in FIG. 3 of the drawings. Referring to FIG. 3, at block 300, the spreadsheet 100 connects to the remote application 204 (see FIG. 2). In the present case, the remote application 204 is a budgeting application, which is communicatively coupled with a database 206. In one embodiment, to initiate the connection with the remote application 204, the user 202 selects the connect button 110. In one embodiment, the connection with the remote application 204 may be via a wide area network (WAN), such as the Internet. As part of the block 300, the spreadsheet 100 performs an authentication operation with the remote application 202 to authenticate the user 202. For example to authenticate the user 202, the spreadsheet 100 may send the login credentials of the user 200, e.g. single sign on or otherwise to the remote application 202.

At block 302, the spreadsheet 100 retrieves its latest version from the remote application 202. Responsive to successful connection and authentication with the remote application 202, in one embodiment, the create button 104 which was previously not selectable (i.e. it was greyed out) becomes available for selection.

Figure 4:
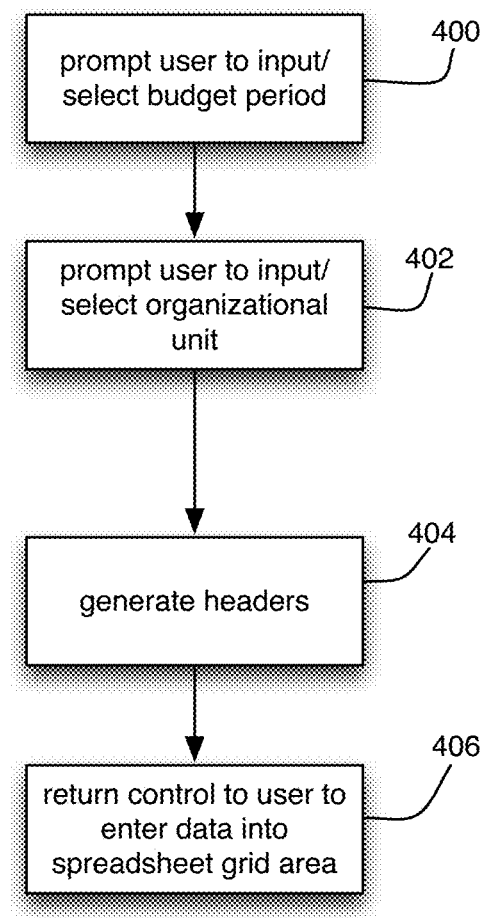

The user 202 selects the create button 104 and responsive thereto, in one embodiment, one or more input pages/forms may be displayed to the user 200. It is to be noted that the spreadsheet 100 may include labels, formulas and/or other values that are independent of the remote application 202. In one embodiment, the forms are designed to capture inputs from the user 200 to facilitate creation of the dimensions for the spreadsheet. FIG. 4 shows the operations performed by the spreadsheet 100 to capture said inputs, in one embodiment. Referring to FIG. 4, at block 400 the user 200 is prompted to select or input a budget period. For this purpose a list of active budget periods may be displayed to the 200 for selection. At block 402, the user 200 is prompted for input or selection of an organization unit. For selection, a list of organization units may be presented to the user 200. In one embodiment, filters may be provided to allow the user 200 to filter said list. Upon completion of the inputs via the forms; the spreadsheet 100 formulates a query based on the inputs. In one embodiment, the spreadsheet 100 is configured to transmit the query to remote application 202 in order to retrieve appropriate row and column header information from the remote application. The block 404 in FIG. 4 indicates this. The grid area 112 shown in cross-hatching in FIG. 1 is then unlocked, i.e. it becomes active. This corresponds to the block 406 in FIG. 4. Thus, the user 200 may input values into the grid area 112.

Once the values have been input into the grid area 112, the user may activate the save button 106. This action causes the spreadsheet 100 to send the user-input budget data to the remote application 202.

Figure 7:
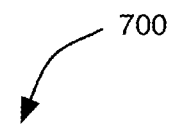
Figure 9:
FIG. 9 shows a spreadsheet generated by a spreadsheet template, in accordance with one embodiment of the invention.

For better understanding of the operations of the spreadsheet 100, consider that the remote application 202 includes a fiscal period table, a budget master table, an organization unit table and a general ledger (GL) table. FIG. 5 shows an example of a fiscal period table 500, FIG. 6 shows an example a budget master table 600, FIG. 7 shows an example an organization unit table 700, and FIG. 8 shows an example a general ledger (GL) table 800. FIG. 9 shows a spreadsheet 900 generated by the inventive template in accordance with the techniques described above.

In order to generate a spreadsheet 900 based on the inventive template the user 200 inputs "FY 13" as the Fiscal Period and "Marketing/UK" as the Organization Unit, when prompted to do so by the template as described above. Using these inputs, dimension ranges are created corresponding to the headers "Fiscal Periods" and "Account". In one embodiment, a dimension range marks a spreadsheet cell as the dimension's starting cell corresponding to a range of cells and applies a behavior pattern e.g. vertical, so that cells are populated vertically with each retrieved remote application record being a new cell in that dimension range. To correctly generate the Fiscal Year and Account dimensions in the spreadsheet 900 a table specifying dimension range behavior is used, in one embodiment. Such a table 1000 is shown in FIG. 10. As will be seen, the table shows that the dimension/data area "Account" starts at cell B6 and is repeated in a vertical direction, whereas the dimension/data area "Fiscal Periods" starts at the cell C4 and is repeated in a horizontal direction.

Figure 11:
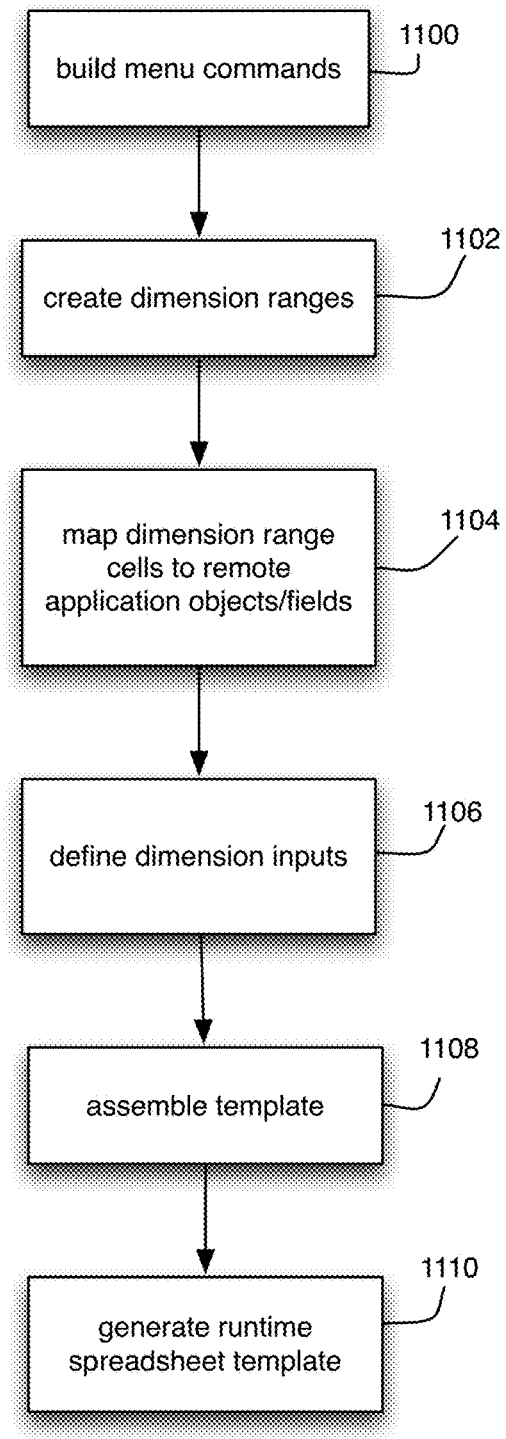
FIG. 11 shows a flowchart of operations to generate a spreadsheet template, in accordance with one embodiment of the invention

Turning now to FIG. 11 of the drawings, there is shown a flowchart of operations to build a template. The flowchart is executed by a template builder application (see FIG. 12) running on a system such as the one described with reference to FIG. 13 below. As will be seen, said flowchart includes the following processing blocks:

Block 1100: In this block menu commands are built. Examples of menu commands include the create command 104, the save command 106, etc. that have been described above with reference to FIG. 1. In one embodiment, under this block a user (hereinafter "builder") may be allowed to select the desired menu commands from a list of predefined menu commands shown to the user. Each of the predefined menu commands is associated with logic to perform the menu command. The builder may be a controller for an enterprise, in the case of budgeting template.

Block 1102: In this block, the dimension ranges that will be populated with data from the remote application 204 are created. For example, consider the table 1000 shown in FIG. 10. The table specifies a starting cell for each dimension and a repeat attribute for each dimension. The repeat attribute controls the directions in which a dimension should be populated, as already has been described. In block 1102, the builder may be prompted to specify the starting cell and repeat attribute for each dimension. The builder may also be prompted to specify the filters for the dimensions. In the case of the budgeting template said filters are Organization Unit and Fiscal Periods, both of which are input by the end user. The table 1000 may be stored within the database 206, in one embodiment.

Block 1104: In this block, each cell in the dimension range is mapped to a field/object within the remote application 202. Thus, under the block 1104, for the spreadsheet 900 (see FIG. 9), cell C3-C7 are mapped to the Fiscal Periods Table 500 in the remote application 202, whereas cells A6-A10 are mapped to values in the General Ledger Accounts Table 800 corresponding to the "Marketing/UK" organization unit in the remote application 202.

Block 1106: In this block, the dimension inputs are defined. In the case of the budgeting example, the dimension inputs are Organization Unit, and Fiscal Year. Under this block, the builder is prompted to input the dimension inputs corresponding to the particular application of the spreadsheet to be built.

Block 1108: In this block, the template is assembled. This may include connecting the menu commands and the dimension inputs to define a workflow when is executed with the template is rum Block 1110: In this block, a runtime version of the spreadsheet template in generated based on the inputs of the builder.

Figure 12:
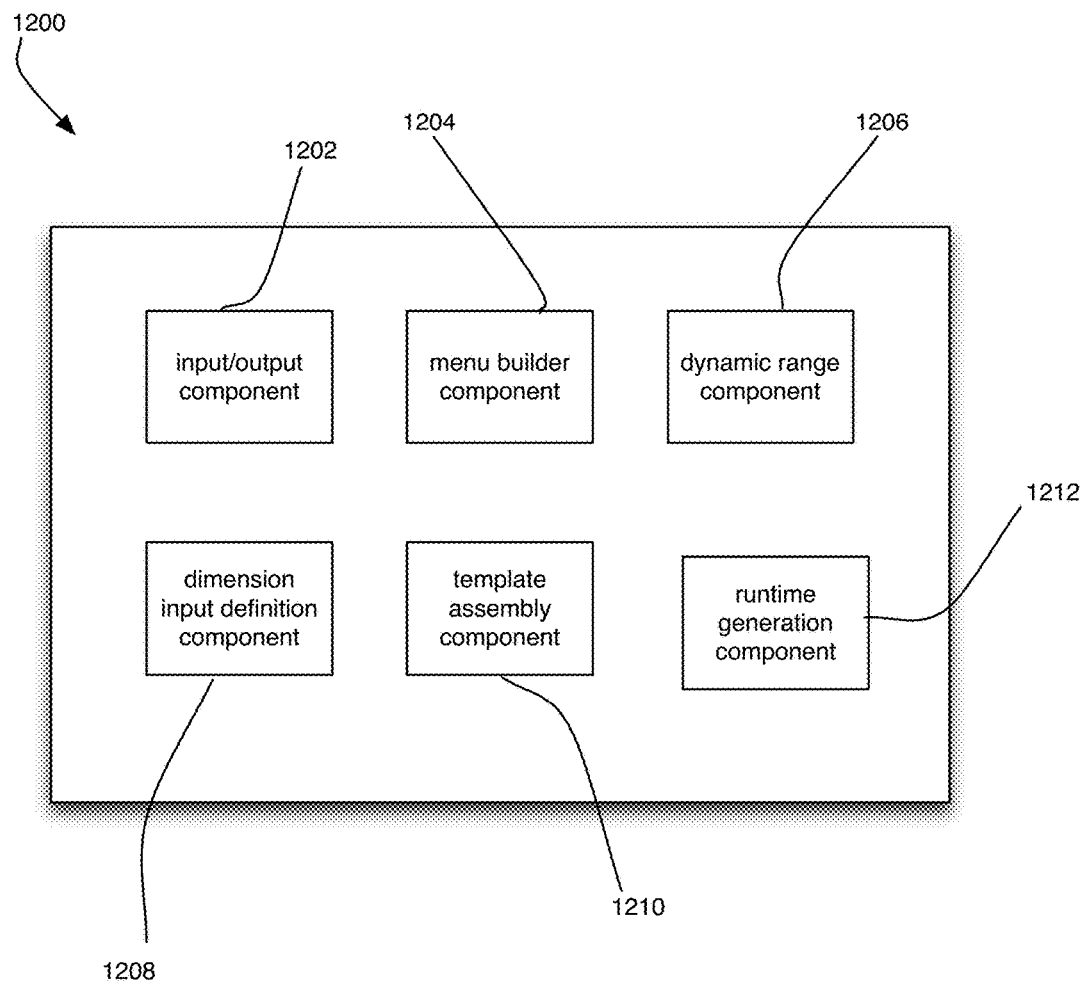
FIG. 12 shows logical view of at least some components of an application to generate a spreadsheet template, in accordance with one embodiment of the invention.

In one embodiment, an application for building the template (hereinafter "template builder") disclosed herein may be implemented as software 1200 which may include the components shown in FIG. 12, at least at a logical level. As will be seen, to implement the techniques and function disclosed herein the software includes the following components:

Input/output component 1202: this component facilitates the capture of user inputs and the displaying of information.

Menu builder component 1204: this component locks the grid area until the headers have been generated.

Dynamic range component 1206: this component authenticates the user to the remote application.

Dimension input definition component 1208: this component generated the row and column headers based on header information received from remote application.

Template assembly component 1210: this component is responsible for assembling the menu and the dimension ranges into a workflow for execution at runtime.

Runtime generation component 1212: this component is responsible generating a spreadsheet template for execution at runtime.

Figure 13:
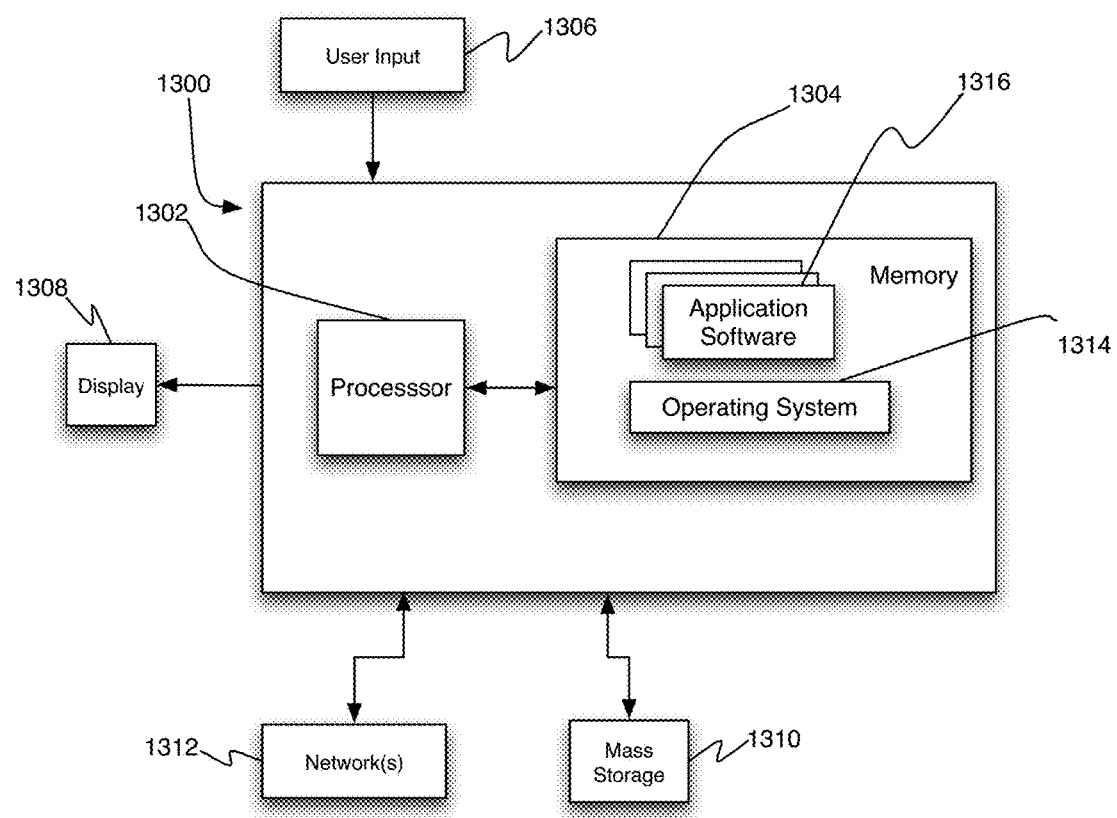
FIG. 13 shows a high-level block diagram of a system that implements the application of FIG. 12, in accordance with one embodiment of the invention

FIG. 13 shows a system 1300, in accordance with one embodiment the implements the template disclosed herein. The system 1300 may includes at least one processor 1302 coupled to a memory 1304. The processor 1302 may represent one or more processors (e.g., microprocessors), and the memory 1304 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1304 may be considered to include memory storage physically located elsewhere in the hardware, e.g. any cache memory in the processor 1202, as well as any storage capacity used as a virtual memory, e.g., as stored on a mass storage device.

The system also typically receives a number of inputs and outputs for communicating information externally. For interface with a user or operator, the hardware may include one or more user input/output devices 1306 (e.g., keyboard, mouse, etc.) and a display 1308. For additional storage, the system 1300 may also include one or more mass storage devices 1210, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1302 and each of the components, as is well known in the art.

The system 1300 operates under the control of an operating system 1314, and executes application software 1316 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A computer-implemented method for creating a spreadsheet template to facilitate creation of a spreadsheet, comprising:
   connecting to a remote application which is communicably connected to a database;
   determining at least one dimension for the spreadsheet based on user input, wherein the user input corresponds to selecting from a list of predefined dimensions associated with predefined tables included in the remote application;
   creating logic to dynamically determine a dimension range for each dimension selected by the user when the spreadsheet template is run and saving said logic in a memory device, wherein
   the logic to dynamically determine the dimension range for each of the dimension comprises a repeat attribute that controls a direction within the spreadsheet in which cells within the dimension are to repeat; and
   mapping each cell within each dimension range to the selected predefined dimensions associated with the predefined tables included in the remote application object.

2. The method of claim 1, wherein the logic to dynamically determine the dimension range for each dimension is configured to filter the remote application based on a user-input value for each dimension.

3. The method of claim 1, further comprising creating logic to generate at least one menu command for insertion into the spreadsheet, the at least one menu command to perform an action.

4. The method of claim 3, wherein the action is to initiate a connection between the spreadsheet and the remote application to authenticate an end user of the spreadsheet template.

5. The method of claim 3, wherein the action is to prompt an end user of the spreadsheet template to input values for each dimension.

6. A non-transitory computer-readable medium having stored thereon a sequence of instruction which when executed by a system causes the system to perform a method, comprising:
   connecting to a remote application which is communicably connected to a database;

determining at least one dimension for the spreadsheet based on user input, wherein the user input corresponds to selecting from a list of predefined dimensions associated with predefined tables included in the remote application;

creating logic to dynamically determine a dimension range for each dimension selected by the user when the spreadsheet template is run, and saving said logic in a memory device, wherein the logic to dynamically determine the dimension range for each of the dimension comprises a repeat attribute that controls a direction within the spreadsheet in which cells within the dimension are to repeat; and mapping each cell within each dimension range to the selected predefined dimensions associated with the predefined tables included in the remote application object.

7. The computer-readable medium of claim 6, wherein the logic to dynamically determine the dimension range for each dimension is configured to filter the remote application based on a user-input value for each dimension.

8. The computer-readable medium of claim 6, wherein the method further comprises creating logic to generate at least one menu command for insertion into the spreadsheet, the at least one menu command to perform an action.

9. The computer-readable medium of claim 8, wherein the action is to initiate a connection between the spreadsheet and the remote application to authenticate an end user of the spreadsheet template.

10. The computer-readable medium of claim 8, wherein the action is to prompt an end user of the spreadsheet template to input values for each dimension.

11. A system, comprising:
a processor; and
a memory coupled to the processor, the memory storing instruction which when executed by the system causes the system to perform a method for creating a spreadsheet template to facilitate creation of a spreadsheet, comprising:

connecting to a remote application which is communicably connected to a database;

determining at least one dimension for the spreadsheet based on user input, wherein the user input corresponds to selecting from a list of predefined dimensions associated with predefined tables included in the remote application;

creating logic to dynamically determine a dimension range for each dimension selected by the user when the spreadsheet template is run, and saving said logic in a memory device, wherein the logic to dynamically determine the dimension range for each of the dimension comprises a repeat attribute that controls a direction within the spreadsheet in which cells within the dimension are to repeat; and mapping each cell within each dimension range to the selected predefined dimensions associated with the predefined tables included in the remote application object.

12. The system of claim 11, wherein the logic to dynamically determine the dimension range for each dimension is configured to filter the remote application based on a user-input value for each dimension.

13. The system of claim 11, wherein the method further comprises creating logic to generate at least one menu command for insertion into the spreadsheet, the at least one menu command to perform an action.

14. The system of claim 13, wherein the action is to initiate a connection between the spreadsheet and the remote application to authenticate an end user of the spreadsheet template.

15. The system of claim 13, wherein the action is to prompt an end user of the spreadsheet template to input values for each dimension.

* * * * *